United States Patent
Van Nest

[15] 3,684,080
[45] Aug. 15, 1972

[54] ADJUSTABLE CONVEYOR SYSTEM

[72] Inventor: William Bradley Van Nest, 3295 Carman Road, Excelsior, Minn. 55331

[22] Filed: March 18, 1971

[21] Appl. No.: 125,521

[52] U.S. Cl..............................198/177 R, 198/139
[51] Int. Cl...............................................B65g 17/20
[58] Field of Search ..198/177, 208, 139, 204; 17/24; 104/108, 106

[56] References Cited

UNITED STATES PATENTS 2,864,513  12/1958  Novack ......................104/108
3,343,650  9/1967  Brown ........................198/177

*Primary Examiner*—Richard E. Aegerter
*Attorney*—Schroeder, Siegfried & Ryan

[57] ABSTRACT

A trolley conveyor system is provided wherein an intermediate section of the conveyor can be vertically displaced, while in operation, relative to the portions of conveyor on either side of the section. Slip rail members are provided to lengthen and shorten the arms connecting the displaceable portion to the fixed rails on each side thereof. A take-up mechanism to compensate for length changes in the system resulting from the raising and lowering of the vertically displaceable portion is also provided.

12 Claims, 8 Drawing Figures

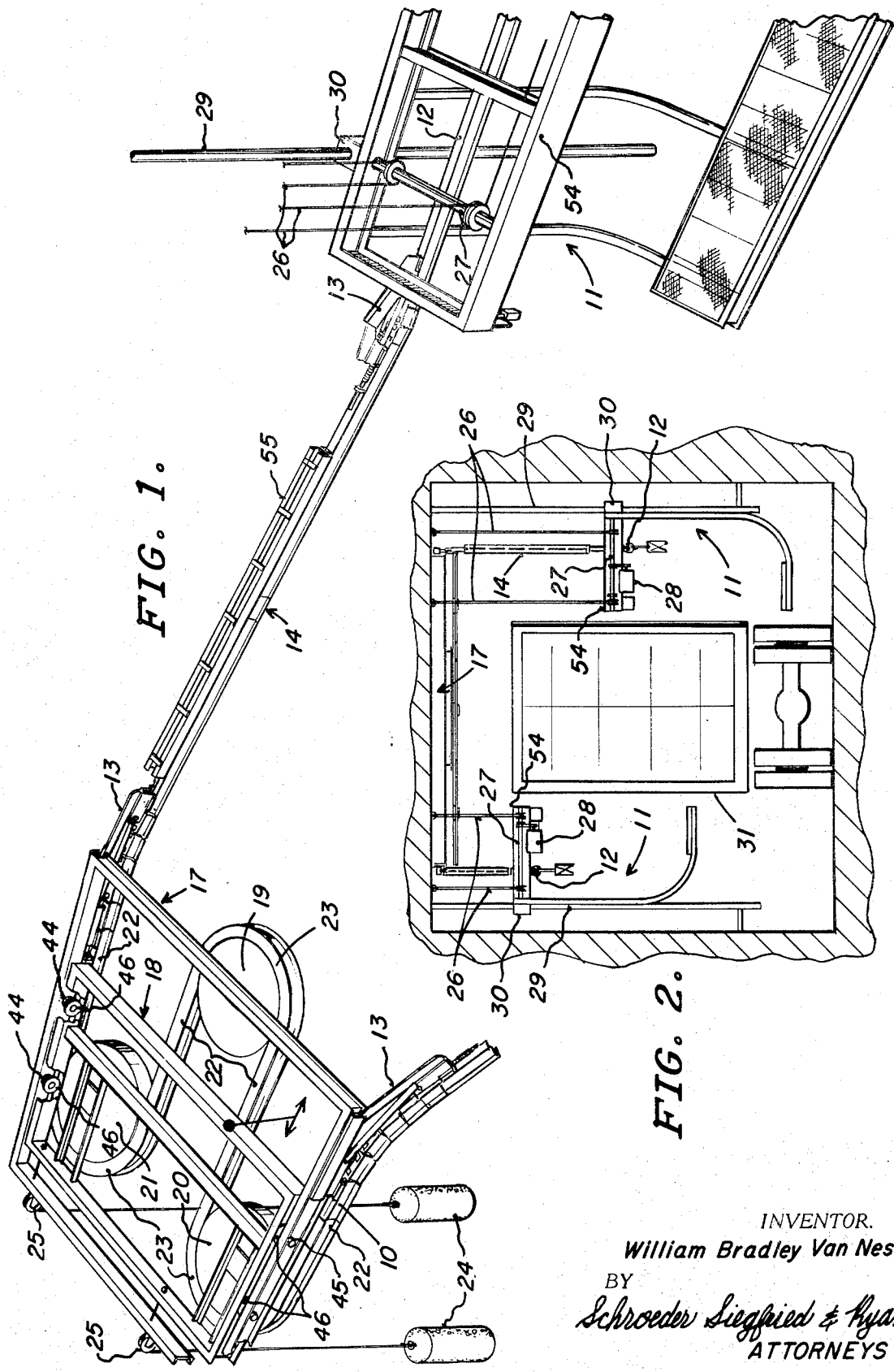

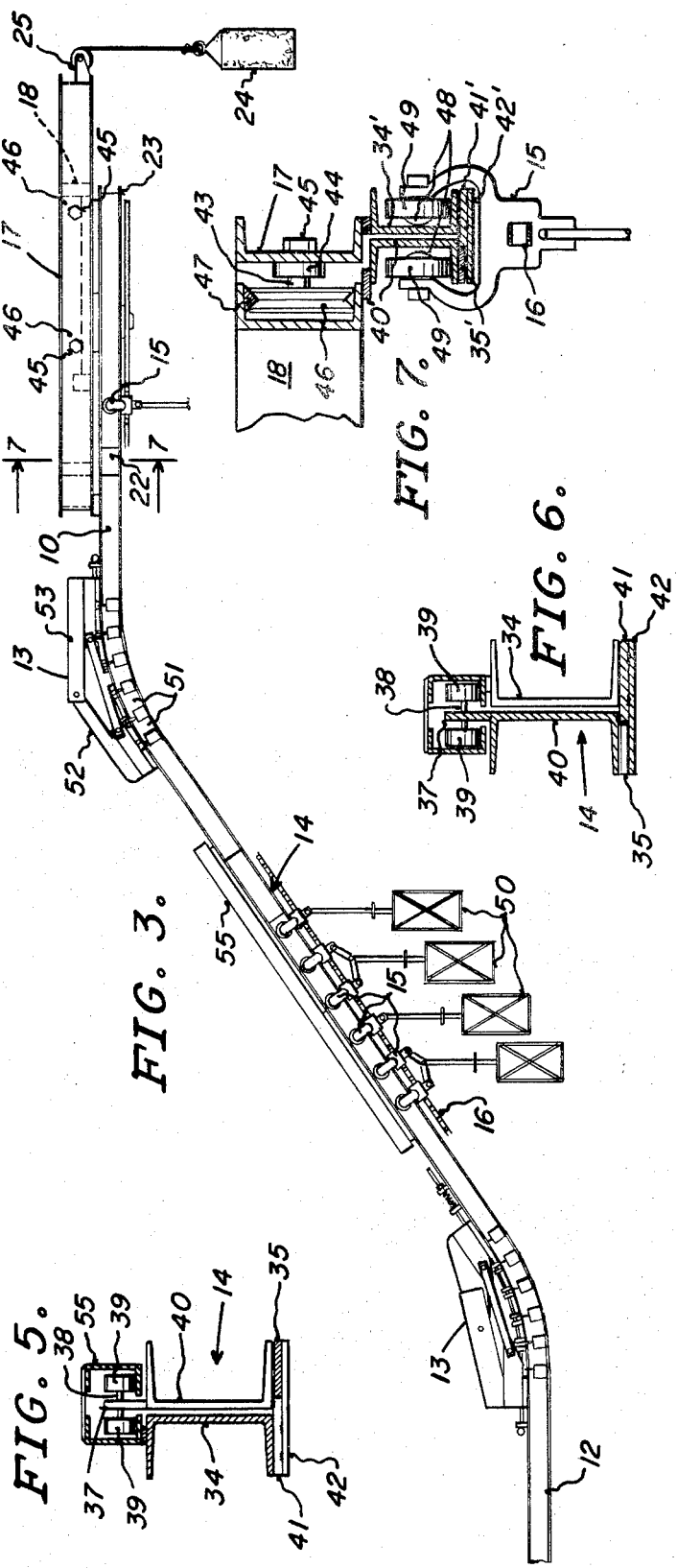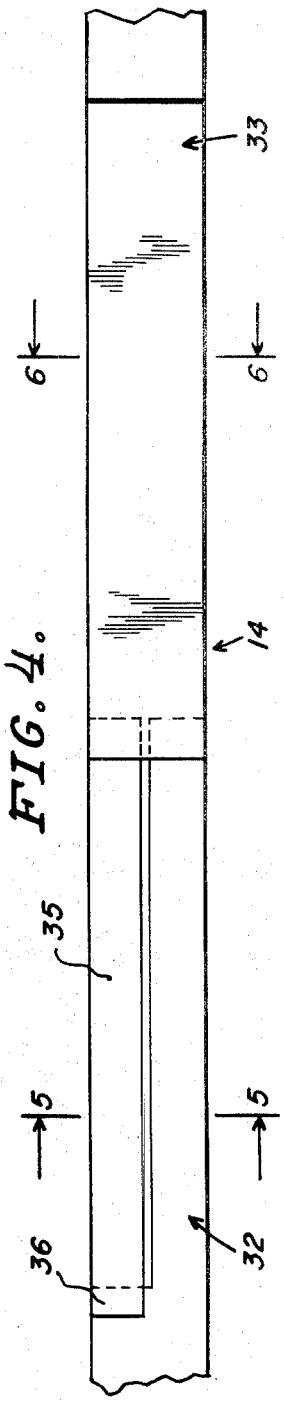

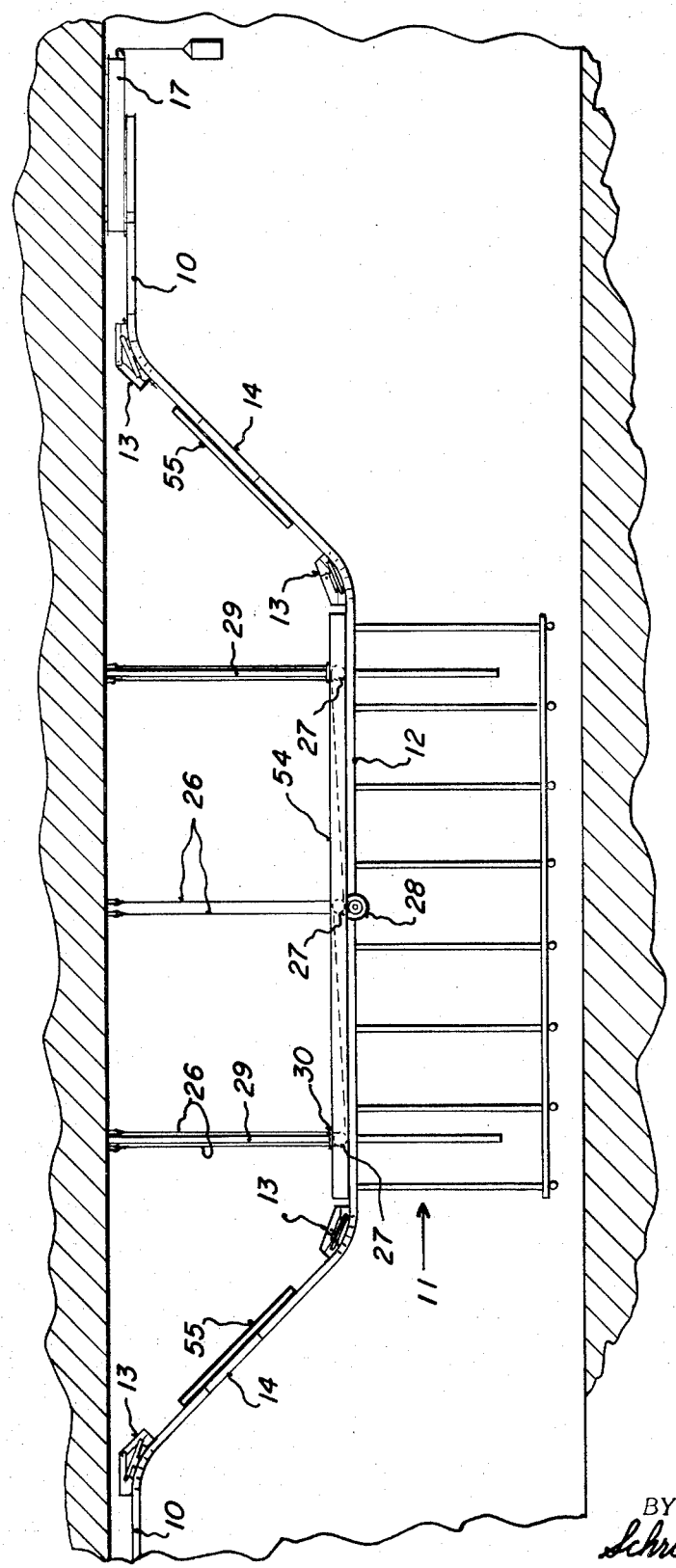

ADJUSTABLE CONVEYOR SYSTEM

The present invention is directed to an improvement in conveyor systems of the type having a series of trolleys moving along a support. It is more specifically directed to an improvement in such trolley systems wherein an intermediate portion of the trolley system can be vertically raised or lowered without any substantial movement to either side of the vertical movement. While my invention will undoubtedly find use in a variety of such trolley type conveyor systems, it will be described with specific particularity to an endless trolley conveyor system utilized in the unloading of fowl such as turkeys from trucks.

In my invention, a conveyor system passes by one side of the truck, around one end of the truck, and then back past the opposite side of the truck so that both sides of the truck can be unloaded simultaneously. In the invention, a section of the trolley conveyor system is mounted to a platform and the platform and section of the trolley conveyor system can be raised or lowered to place the operators in position to readily and conveniently reach birds at various levels on the bed of the truck.

Trolley conveyor systems have been known in the past for loading and unloading trucks wherein a portion of the conveyor system was vertically displaceable. However, these systems have functioned such that the platform and vertically displaceable section of the trolley conveyor moved upwardly and downwardly with not only a vertical component but also a horizontal component. To compensate for the horizontal movement, the platform section needs extra length or the truck must be moved during unloading. As my system provides only a vertical component to the motion of the vertically displaceable section, the platform and displaceable track section need only be so long as to cover the length of the truck and does not need to be of greater length to compensate for the horizontal displacement as the unit is raised and lowered.

As opposite sides of the truck may not be loaded with equal numbers of birds, it is desirable that the vertically displaceable section of the trolley rail on each side of the truck be raised or lowered at the will of the operators on the particular side. In accordance with my invention, this can be readily accomplished.

In unloading operations, it is desirable that the unloading shed be one that the trucks may drive through. For systems with tracks on both sides of the truck, this necessitates that a portion of the track be elevated to a height sufficient to allow the truck to pass under. In one of the prior art systems, a ceiling of great height was required in the unloading shed, as the overall assembly, including that portion which passed over and around the end of the truck, moved along with the vertically displaceable section. If the conveyor system at its lowest point was raised with a vertical component of 7 feet, then the entire assembly that was already higher than the bed of the truck would likewise be raised 7 feet above its initial position. The total height within the building would thus be 20 or more feet. Such specially constructed unloading sheds in conjunction with the balance of a building required additional costs of construction. In my invention, only moderate clearance above the top of the truck is required.

Generally my invention includes a conveyor system wherein a vertically displaceable section intermediate fixed portions of the conveyor track is joined to the fixed portion by arms which have adjustable elbow portions at each end thereof. The arm members are constructed so that their length changes to compensate for the vertical raising and lowering of the intermediate section of track. As such a construction is provided on both sides of the displaceable central portion, a totally vertical component of motion is achievable. I have also provided a region within the conveyor system which compensates for the change in lengths in the arms joining the displaceable section to the fixed portion of the track so that the overall length of the conveyor system remains the same. This permits the entire system to be operated without any change in the number of trolleys or the spacing therebetween. The platform moves vertically without tilting.

BRIEF DESCRIPTION OF THE DRAWINGS

FIG. 1 is a perspective view of a portion of a vertically displaceable conveyor and a track length adjusting arrangement;

FIG. 2 is an end elevational view of the vertically displaceable conveyor system and supporting platform in use for unloading a truckload of turkeys;

FIG. 3 is a side elevational view of a portion of the conveyor assembly of FIG. 1;

FIG. 4 is a bottom plan view of the track slip joint used in the invention in fully extended form;

FIG. 5 is a cross sectional view along line 6—6 of FIG. 4;

FIG. 6 is a cross sectional view along line 6—6 of FIG. 4;

FIG. 7 is a cross sectional view along line 7—7 of FIG. 3, including a portion of the take-up apparatus of FIG 1; and FIG. 8 is a schematic side elevational view of the vertically displaceable track section.

Turning first to FIGS. 1 and 8, there is shown in perspective and schematic view a portion of a trolley conveyor system which includes fixed I-beam portions 10. These fixed portions are fixed in the sense that they do not have any vertical or horizontal displacement during operation of the conveyor system. They will be mounted to support members (not shown) extending from the walls and/or ceiling of the building.

Intermediate the fixed horizontal portions 10 of the conveyor system is an intermediate portion of the conveyor system generally designated 11, which is vertically displaceable. This intermediate portion 11 includes a horizontal section of I-beam 12, which is shown as mounted to the overhead portion 54 of a platform structure for operators utilizing the trolley conveyor system.

Where identical elements are shown in the several views, they will be given the same numerical designations.

Connecting the horizontal portions of the I-beam 10 and 12 to the intermediate member 14 are adjustable arcuate connectors or elbows 13 which are constructed of a series of segments which permit a variation of the connector from a straight line between sections 10 and 12 to the double curve arrangement shown in FIGS. 1, 3 and 8.

Intermediate the arcuate connections 13 on either end of section 12 is an intermediate section of variable length I-beams 14, which will be described with greater particularity hereinbelow. Section 14 includes two I-beams having the mating portions thereof of substantially one-half section. Each are so constructed and arranged that they telescope and combine to provide a variable length I-beam. The need for such a variable length section 14 will be apparent to the reader when he considers that the spacing between elbow sections 13—13 on each end of the vertically displaceable region 12 will vary depending upon whether the section is in a raised or lowered position.

As the sections 13 are lengthened or shortened, it will be apparent that the overall length of the track portion of the conveyor system will be changed. As the track system utilizes trolley members running therealong, it becomes necessary to adjust the overall length of the track system so as to compensate for the changes brought about by raising and lowering track section 12. Referring to FIG. 3, it can be seen that the individual trolley members 15 are spaced and are moved along the track on their wheels by means of a chain or cable 16. When the track system has its length shortened or increased, a surplus or shortage of total cable length 16 would take place unless means were provided for compensating for the change brought about by the telescoping of members 14.

I have provided such a means which is schematically illustrated in FIG. 1, wherein a fixed position frame member 17 is constructed to support a variable position frame 18. In the form shown, frame 18 is mounted by means of wheels guided by frame 17 so that it can move in the directions illustrated by the arrow. Mounted to fixed frame 17 is a wheel 19, while traction wheels 20 and 21 are mounted to the variable position frame 18. Passing around wheels 19, 20 and 21 are curved portions of an I-beam track system 23, which are fixedly mounted to the frame member supporting wheels 19, 20 and 21, respectively. Members 23 comprise a curved track for the trolleys movement about the traction wheels 20 and 21, which include conventional means (not shown) for providing the power for moving the trolleys 15.

Intermediate fixed track 10 and sections 23, as well as intermediate the section 23 of traction wheel 20 and the traction wheel 19, are track forming slip joints generally designated 22. Members 22 telescope in a manner analogous to section 14, so that as section 14 is decreased in length, sections 22 will be increased in length to provide a constant length for the overall track system. In order to insure that a constant length exists, a simple pulley and weight system can be used to move frame 18 within the confines of frame 17. Such a system is shown in FIG. 1 and FIG. 3 wherein a weight 24 is connected by means of a pulley wheel 25 to the moveable frame 18. Weights 24 are of a suitable size to insure that the movement of frame 18 absorbs any slack in cable 16 or moves to absorb the lengthening of track that occurs as a result of the vertical displacement of section 12 of the track.

As can be best seen in FIG. 2, track 12 is mounted beneath the overhead portion 54 of an operator platform. The platform is connected by means of cables 26 to the ceiling of the room wherein the assembly is located. Means such as drums 27, which are rotatably engaged to a motor 28, may be used to raise and lower the platforms according to the needs of the operator. As the cable is wound upon drums 27, the platform will rise. While not required, a guide post 29, passing through a journaled opening in a plate 30 attached to the platform, may be used to inhibit any tendency toward lateral sway of the platform during use. It will also be of some assistance in assuring a totally vertical motion of assembly 11 as it is raised and lowered. As vertically moveable portion 11 is raised and lowered through means of cables 26, it will be apparent that there will be little tendency for the unit to shift laterally during such raising and lowering.

In FIG. 2 there is shown in a plan end view two platforms and the attendant track members 12 being utilized to unload a truck 31. As can be seen, the left-hand platform is at a higher elevation than the platform on the right. It should be appreciated that unloading sheds such as schematically illustrated in FIG. 2 are desirably constructed so that a truck to be unloaded can enter at one end and exit by driving straight through the shed. Therefore, it is necessary that the conveyor system where it passes across between the platforms be elevated so that it clears the uppermost portion of the truck. It is also desirable that the individual platforms being utilized to unload the truck be individually adjustable. For a variety of reasons, one side of the truck may be unloaded more rapidly than the other, and it is highly advantageous that the operators on each side of the truck can adjust their platform height, including the intermediate section 12 of the conveyor rail, to the working height most convenient for unloading.

The telescoping rail construction to be used for sections 14 and section 22 of the overall conveyor system are best shown in FIG. 4 and in the sectional views of FIGS. 5, 6 and 7. It will be noted that section 14 of the telescoping I-beam section of the conveyor rail is in a sense "floating," in that it is not mounted to a wall or ceiling. It is therefore necessary that a construction be provided for this portion of the telescoping rail which aids in guiding the two telescoping sections together and provides a friction reducing means for the motion of the rails as they telescope. This is illustrated in cross sectional view in FIGS. 5 and 6. In the case of the sections 22, a somewhat different mounting structure for the telescoping rails is provided, and this is illustrated in cross sectional view in FIG. 7.

Turning to FIG. 4, there is illustrated a bottom plan view of a section of telescoping I-beams in accordance with the invention corresponding to the I-beam of sections 14 and 22. The principal portions of the I-beam construction are substantially the same for each of these regions 14 and 22, with the essential differences being the manner in which the I-beam is mounted to guiding and supporting means. I-beam members 32 and 33 are formed so as to have the forward portion thereof shaped so that each has a one-half section of an I-beam. The one-half portion of beam 32 is shown in cross sectional view in FIG. 5 as 34. An elongated plate member 35 has been welded at 36 to the base of the beam 32, where it is a full I-beam construction. Above I-beam 32 and overlapping the slip joint intermediate I-beam 32 and 33 is a support and guide member 55. This guide member 55 is formed to have a channel into which projects a vertical plate member 37, which is attached as by welding to the one-half I-beam portion 40 of I-beam 33. Plate 37 has a shaft member 38 depending therefrom and at right angles thereto. Shaft 38 supports wheel members 39, which rollably engage the lower turned in edges of channel 36. Wheels 39 thus act as a support and low friction rolling means for movement of the one-half I-beam portion 40 during telescoping of the overall slip joint.

The forward portion 40 of I-beam 33 is constructed by welding plate members 41 and 42 to the base in the manner best illustrated in FIG. 6. These plate members provide the necessary spacing and channels for the introduction of member 35 when the two half I-beam sections are engaged.

Turning now to FIG. 7, there is illustrated in cross sectional view slip joint 22, which is generally of the same construction as that discussed above with regard to FIGS. 5 and 6. In FIG. 7, the numerical designation of parts corresponding to the same functions as those described in FIGS. 5 and 6 will be given by the same number with a prime superscript. However, in FIG. 7, the I-beam portion 40' is welded to frame 18 for movement therewith, rather than being welded to channel guide 36, as in FIGS. 5 and 6. The one-half I-beam portion 34' and its attached portions 41' and 42' would extend outwardly back to the rigid horizontal I-beam 10 and be fixedly mounted thereto. Portion 34' is shown also as welded to frame 17.

Surrounding frame 18 and mounted by means not shown to a suitable support such as anchor bolts in the ceiling is a frame 17. As can be seen, frame 17 is provided with a shaft member 43 extending inwardly therefrom and secured to frame 19 by fastening means such as nuts 44 and 45. Rotatably mounted to the end of shaft 43 is a grooved wheel 46, which supports frame 18 in a manner to permit movement of frame 18 relative to the longitudinal axis of frame 19. A projection 47 is attached to frame 18 to keep wheel 46 within the confines of the opening of frame 18. Thus it can be seen that frame 18 rolls along by means of wheels 46 within the limitations of movement imposed by the tension of weights 24 counterbalanced by the allowable slack in the trolley members.

Also illustrated in FIG. 7 is a trolley member 15 of a generally U-shaped configuration with shafts 48 extending inwardly from both arms of the U. Wheels 49 are rotatably mounted to shaft 48 for supporting the trolley member 15 for rotatable transfer along the I-beam. The cable member 16 extends through trolley 15 and is fixed thereto to provide a means of moving the trolley along the I-beam. Supported from the trolley member is a wire frame generally designated 50 of a conventional type for engaging the legs of the turkey during transport of the turkey through the meat processing plant.

Referring now to FIG. 3, there is shown in somewhat simplified form the nature of the flexible elbow member 13. This elbow member is comprised of a plurality of I-shaped segments 51 which are pivotally joined and constructed so as to maintain a continuous track at the lower portion thereof. The individual segments 51 are mounted by a cable to elbow means 52 and 53; these members, in turn, being fixedly mounted to the straight portion of the track. The lower elbow 13 will be of a construction similar to that of the upper elbow members. The elbow members per se shown in abbreviated form in the drawings are the same as that disclosed in the U.S. Pat. No. 2,931,315 to Daigle. For further details regarding the construction of the elbow members, the reader is referred to this patent, which is incorporated herein by reference. It should be appreciated that while the elbow members in accordance with the Daigle teachings are particularly suitable for the form of the invention described herein, other elbow members accomplishing the same purpose of providing a flexible joint for a track means can be utilized and still stay within the framework of my invention.

I claim:

1. A trolley conveyor system having an intermediate region thereof vertically displaceable while retaining its original orientation, comprising:
   a. a fixed rail constructed and arranged to support and direct trolleys moving therealong,
   b. a vertically displaceable rail section intermediate portions of said fixed rail,
   c. means for vertically displacing said section,
   d. a plurality of connecting rail arms, including at least one variable length arm intermediate the fixed rail and each end of the displaceable rail,
   e. means joining said fixed rail, said arms and said displaceable rail to form a continuous rail system, said joining means including at least two adjustable elbow rail means intermediate said fixed rail and each end of said displaceable rail, and
   f. take-up means for maintaining the length of rail in said conveyor system at a predetermined value.

2. A system in accordance with claim 1 wherein said take-up means includes at least one rail portion having a U-shaped configuration wherein the arm portions of said U are of variable length and each are joined at one end to fixed rail sections and the curved portion of said U is movably mounted and biased to extend and retract the arm portions of said U to respond to changes in the overall length of the rail system created by vertical displacement of said vertically displaceable rail section.

3. A system in accordance with claim 1 wherein said variable length arms are constructed of telescoping sections of rail.

4. A system in accordance with claim 1 wherein the rail members are I-beams and the variable length arms are constructed of first and second I-beams, the mating portions of said first and second I-beams each being a vertical one-half portion of an I-beam positioned in sliding engagement to form a full I-beam, at least one of said I-beam sections having joined to the lower edge thereof a plate member extending from the full I-beam portion and parallel to the base thereof outwardly under said one-half I-beam to provide a surface for trolleys to roll upon when the telescoping sections are in an extended position.

5. A conveyor system in accordance with claim 4 including a plurality of trolleys supported by wheels in rolling engagement with the lower horizontal surfaces of said I-beam and cooperatively joined by an endless cable extending substantially parallel to said rails.

6. A conveyor system in accordance with claim 1 wherein said vertically displaceable rail section is mounted to a platform.

7. A conveyor system in accordance with claim 1 wherein said system includes a plurality of vertically displaceable rail sections.

8. A conveyor system in accordance with claim 7 wherein each of said vertically displaceable sections includes means for vertically displacing the section independently of the other vertically displaceable sections.

9. A system in accordance with claim 4 wherein a channel shaped guide member is mounted to the upper portion of said first I-beam and extends above the mating portion thereof and said second I-beam is suspended from wheels in rolling engagement with said channel guide.

10. A trolley conveyor system having intermediate regions thereof vertically displaceable, comprising:
 a. a fixed position I-beam,
 b. a plurality of vertically displaceable I-beam sections intermediate portions of said fixed I-beam,
 c. means for vertically displacing each of said I-beam sections,
 d. a plurality of connecting I-beam arms for each vertically displaceable I-beam, including at least one variable length I-beam intermediate each end of each vertically displaceable I-beam and the fixed I-beams,
 e. means joining said fixed I-beams, said arms and said displaceable I-beams to form a continuous I-beam rail, said joining means including at least two adjustable elbow I-beams intermediate each end of each vertically displaceable I-beam and said fixed I-beam, and
 f. take-up means for maintaining the length of rail in said conveyor system at a predetermined value.

11. A system in accordance with claim 10 wherein each of said vertically displaceable I-beam sections may be vertically displaced independently of the other.

12. A system in accordance with claim 11 wherein each of said vertically displaceable I-beam sections is mounted to the upper portion of a platform assembly.

* * * * *